United States Patent
Lee et al.

(10) Patent No.: US 10,408,464 B2
(45) Date of Patent: Sep. 10, 2019

(54) LIGHTING DEVICE AND COOKING APPLIANCE INCLUDING LIGHTING DEVICE

(71) Applicant: LG ELECTRONICS INC., Seoul (KR)

(72) Inventors: Dong Yeol Lee, Seoul (KR); Sungho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/918,610

(22) Filed: Mar. 12, 2018

(65) Prior Publication Data

US 2018/0259193 A1   Sep. 13, 2018

(30) Foreign Application Priority Data

Mar. 13, 2017 (KR) .................. 10-2017-0031102

(51) Int. Cl.
| | |
|---|---|
| F24C 15/00 | (2006.01) |
| F21V 3/04 | (2018.01) |
| F21V 15/01 | (2006.01) |
| F21V 8/00 | (2006.01) |
| F21V 7/05 | (2006.01) |
| F21Y 115/10 | (2016.01) |

(52) U.S. Cl.
CPC ............ *F24C 15/008* (2013.01); *F21V 3/049* (2013.01); *F21V 7/05* (2013.01); *F21V 15/01* (2013.01); *G02B 6/0001* (2013.01); *F21Y 2115/10* (2016.08)

(58) Field of Classification Search
CPC .......... F24C 15/008; F21V 3/049; F21V 7/05; F21V 15/01
See application file for complete search history.

(56) References Cited

U.S. PATENT DOCUMENTS

2009/0316385 A1* 12/2009 Weber .................. F21K 9/00
                                                              362/92
2012/0127729 A1   5/2012 Brown et al.

FOREIGN PATENT DOCUMENTS

| DE | 40 25 734 | 2/1992 |
|---|---|---|
| DE | 10 2012 223 465 | 6/2014 |
| EP | 2 128 526 | 12/2009 |
| EP | 2 913 591 | 9/2015 |
| EP | 3 045 819 | 7/2016 |
| JP | 2008-307235 | 12/2008 |

OTHER PUBLICATIONS

European Search Report dated Aug. 6, 2018 issued in EP Application No. 18161576.6.

* cited by examiner

*Primary Examiner* — Anne M Hines
(74) *Attorney, Agent, or Firm* — Ked & Associates LLP

(57) ABSTRACT

A lighting device and a cooking appliance including a lighting device are disclosed herein. The lighting device may include a light source installed outside a cavity where a through hole is formed, the light source including a light emitting diode (LED), a light tube installed outside the cavity to be connected to the light source and receiving light emitted from the LED via a light incidence surface that diffuses the light in an area where the through hole is formed, a transmissive cover installed on the cavity to cover the through hole to transmit the light diffused in the light tube toward inside of the cavity, and a supporter installed outside the cavity to support the light source such that it is spaced apart from the cavity.

16 Claims, 10 Drawing Sheets

LIGHTING DEVICE AND COOKING APPLIANCE INCLUDING LIGHTING DEVICE

CROSS-REFERENCE TO RELATED APPLICATION(S)

This application claims the priority of Korean Patent Application No. 10-2017-0031102, filed in Korea on Mar. 13, 2017, in the Korean Intellectual Property Office, the disclosure of which is hereby incorporated by reference in its entirety.

BACKGROUND

1. Field

A lighting device and a cooking appliance including a lighting device are disclosed herein.

2. Background

A cooking appliance is a type of household appliance that cooks food or other items (hereinafter, "food"), and is typically installed in a kitchen. Such cooking appliances may be classified by heat source, shape, or type of fuel, for example.

Cooking appliances may be classified into open-type cooking appliances and closed-type cooking appliances, depending on where food is placed and how it is cooked. Closed-type cooking appliances may include ovens or microwave ovens, for example, while open-type cooking appliances may include cooktops or hobs, for example.

A closed-type cooking appliance has a closed space where food is placed. The food is cooked by heating the closed space. A closed-type cooking appliance includes a chamber in which food is placed and which is closed during cooking. The cooking chamber is where food is actually cooked, and may be opened and closed by a door installed in front of the cooking chamber. A heat source may be provided inside or outside the chamber. The heat source may include a gas burner or an electric heater, for example.

Inside the cooking chamber, where the heat source may be installed, a lighting device may be installed. The lighting device may be turned on to illuminate the inside of the cooking chamber so that a doneness of the food may be easily checked from the outside of the chamber while food is cooked inside of the cooking chamber, and may also be turned on when the door is opened.

The use of light-emitting diodes (LEDs) in household appliances is becoming more frequent. LEDs have various advantages, such as a small size, a high luminance relative to power consumption, a long service life, and a low manufacturing cost, so they often replace existing bulbs used as an illumination device or a display.

Unfortunately, LEDs are vulnerable to heat and may not operate normally or as intended in a hot cooking chamber of a closed-type cooking appliance. Therefore, it is difficult to employ LEDs as the illumination source inside of a cooking chamber of a closed-type cooking appliance.

BRIEF DESCRIPTION OF THE DRAWINGS

Embodiments will be described in detail with reference to the following drawings in which like reference numerals refer to like elements, and wherein.

DETAILED DESCRIPTION

Figure 1:
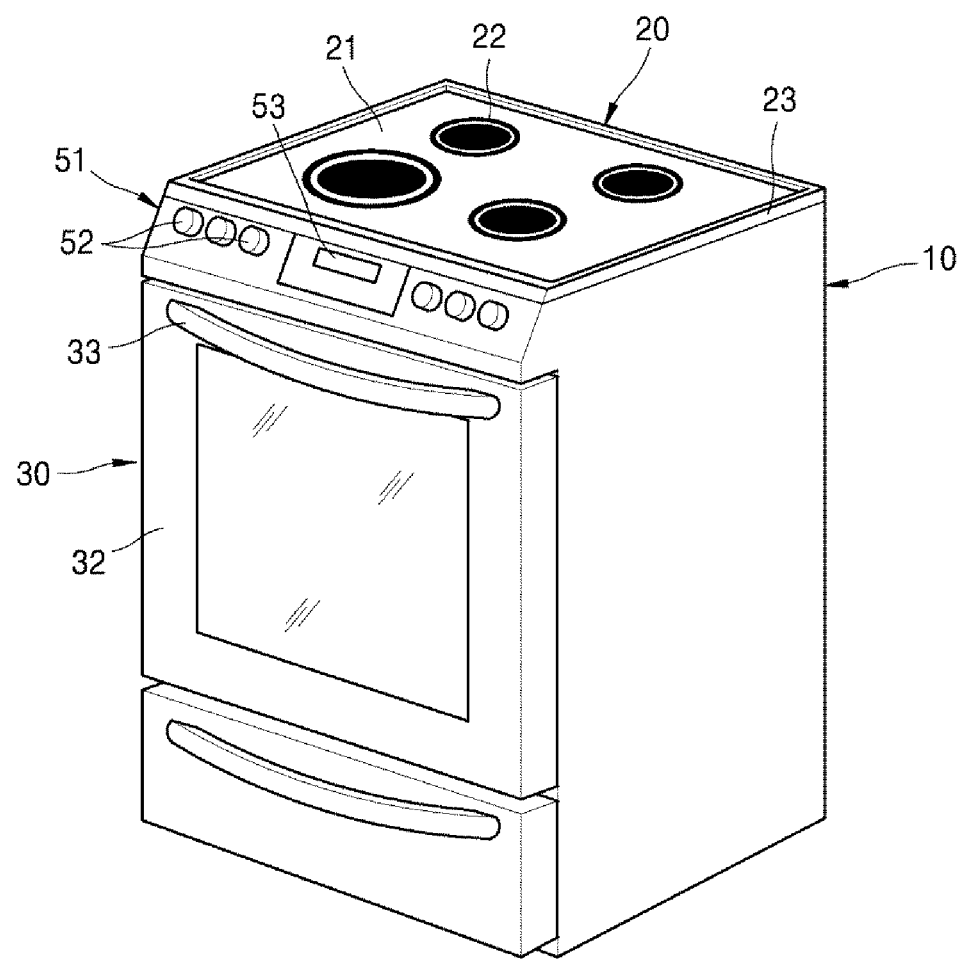
FIG. 1 is a perspective view of a cooking appliance according to an embodiment.
Figure 2:
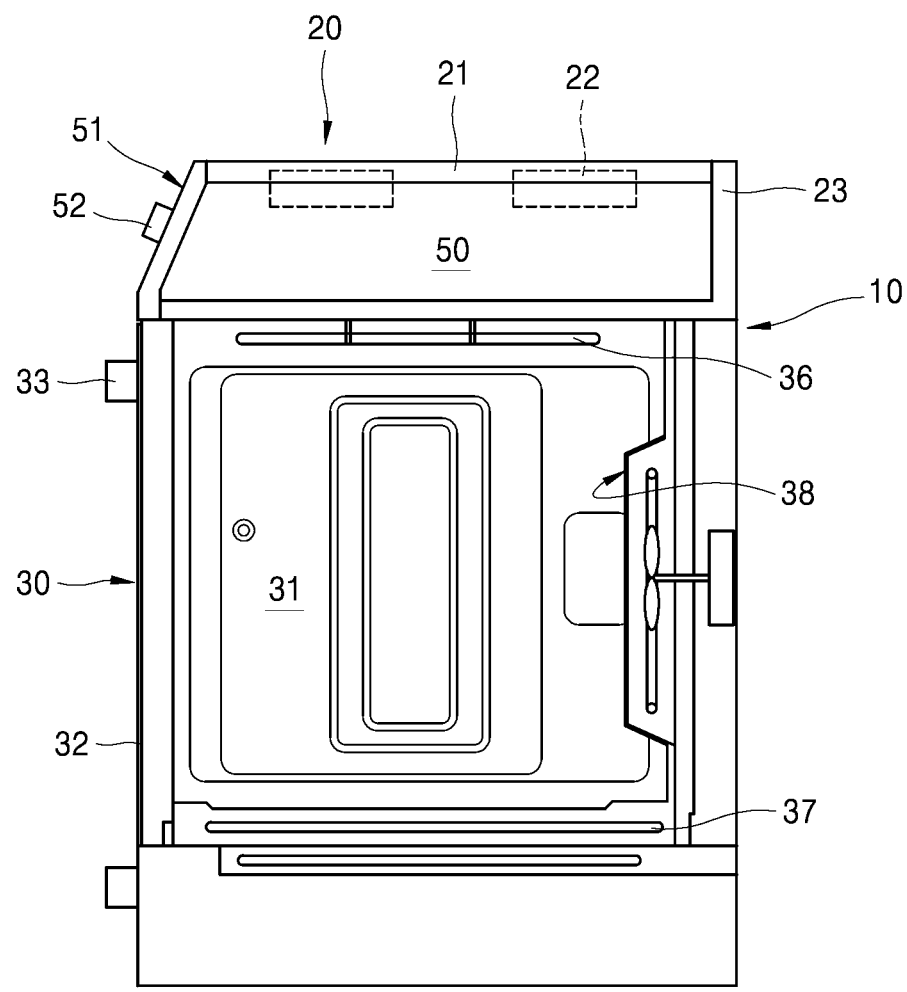
FIG. 2 is a side cross-sectional view of a cooking appliance according to an embodiment.

FIG. 1 is a perspective view of a cooking appliance according to an embodiment. FIG. 2 is a side cross-sectional view of a cooking appliance according to an embodiment.

Referring to FIGS. 1 and 2, an exterior of the cooking appliance according to an embodiment may be formed by a main body 10. The main body 10 may have a box or cuboid shape, for example, and may be formed using a material having a predetermined strength to protect a plurality of components provided therein.

A cooktop 20 is provided above the main body 10. The cooktop 20 may cook or heat food or a food container placed on the cooktop. The cooktop 20 may include a top plate 21 that forms a top exterior of the cooktop and may support food or food containers. The top plate 21 may be a rectangular plate having a predetermined thickness and may be made of a ceramic glass having a good heat resistance, for example. A typical ceramic glass may be sufficient, instead of a glass having a special surface treatment to provide lighting effect in a certain area. A side exterior of the cooktop 20 may be formed by a cooktop case 23 provided outside the cooktop 20.

One or more cooktop heaters 22 that heat food or food containers may be located under the top plate 21. The cooktop heaters 22 may include, for example, an induction heater that applies a current to a magnetic coil to generate a vortex current and heats the food or food container to cook the food, or may include a radiant heater that cooks the food or food container using radiation heat from a heating coil. In addition, the cooktop heaters 22 may include a hidden radiant burner that heats the top plate using a ceramic uniform burner that uses energy generated by burning gaseous fuel, thereby using radiation energy instead of a direct fire.

An oven 30 may be installed under the cooktop 20. A cooking chamber 31 where food is cooked may be located inside the oven 30. The cooking chamber 31 may have a box or cuboid shape, for example, with its front face open. Food inside of the cooking chamber 31 may then be cooked by heating an internal space of the cooking chamber 31 while the cooking chamber 31 is shielded.

In the oven 30, a heater may be provided that heats the cooking chamber 31. For example, an upper heater 36 that heats the below internal space of the cooking chamber 31 may be provided above the cooking chamber 31, while a lower heater 37 that heats the above internal space of the cooking chamber 31 may be provided below the cooking chamber 31.

A convection fan 38 may be provided at a rear side of the cooking chamber 31 to heat the internal space of the cooking chamber 31 with convected hot air. The convection fan 38 may forcibly blow air in the internal space of the cooking chamber 31. More specifically, the convection fan 38 may heat the internal space of the cooking chamber 31 by suction and heating the air in the internal space of the cooking chamber 31 and then discharging the air back into the internal space of the cooking chamber 31 so that the food in the internal space of the cooking chamber 31 may be uniformly heated.

A door 32 that opens and closes the cooking chamber 31 may be rotatably installed at the oven 30. The door 32 may have a general rectangular or box shape having a predetermined thickness. A user may grasp a handle 33 that may be attached on a front face of the door 32 to open and/or close the door 32 by rotating it.

A control panel 51 may be provided in front of the cooktop 20 and/or above the door 32. The control panel 51 may have a box or cuboid shape, for example, having a predetermined internal space. An input 52 may be provided on a front face of the control panel 51 to enter a user's signals to operate the cooktop 20 and the oven 30. The input 52 may include a plurality of operation switches. A user may directly input operation signals using the operation switches.

The control panel 51 may further include a display 53 that provides operation information of the cooking appliance or cooking information of the food. A user may see various information on the cooking appliance via the display 53.

An electrical room 50 which houses electrical components may be provided in the internal space of the main body 20. More specifically, the electrical room 50 may be located between the cooktop 20 and the oven 30. The control panel 51 may be provided on a front face of the electrical room 50, substantially shielding the front face of the electrical room 50.

Figure 3:
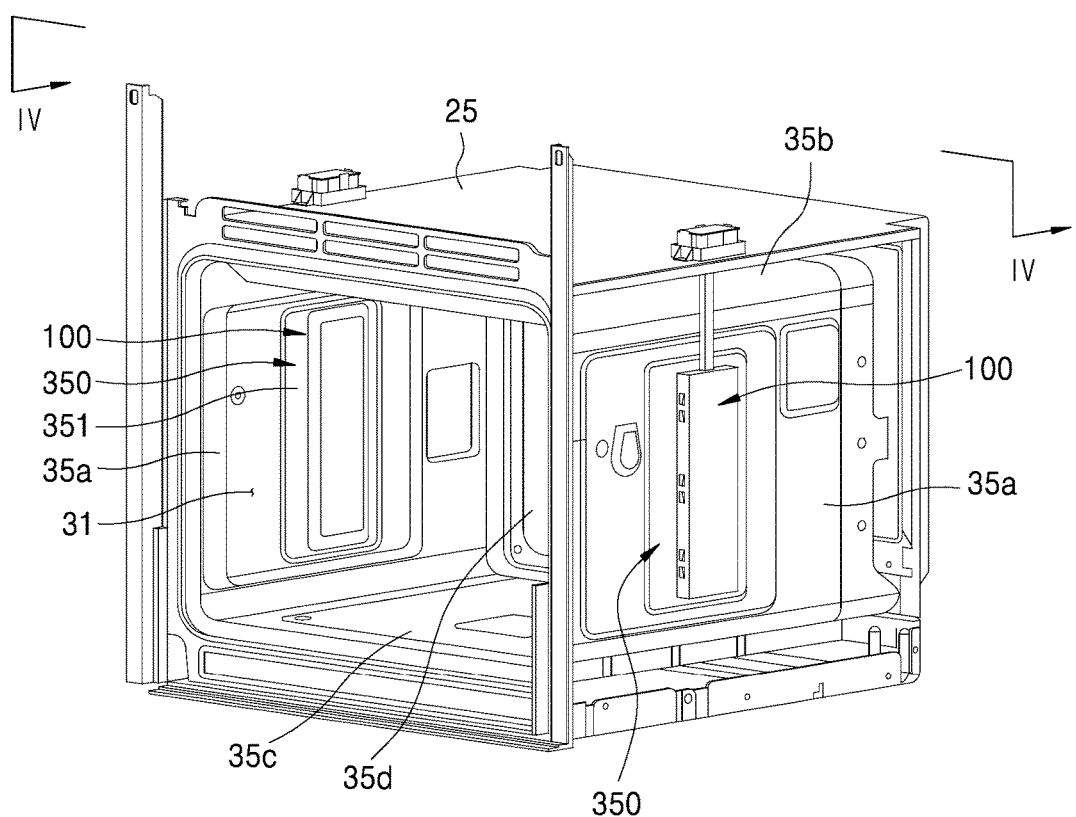
FIG. 3 is a view showing some components separated from the cooking appliance according to an embodiment.
Figure 4:
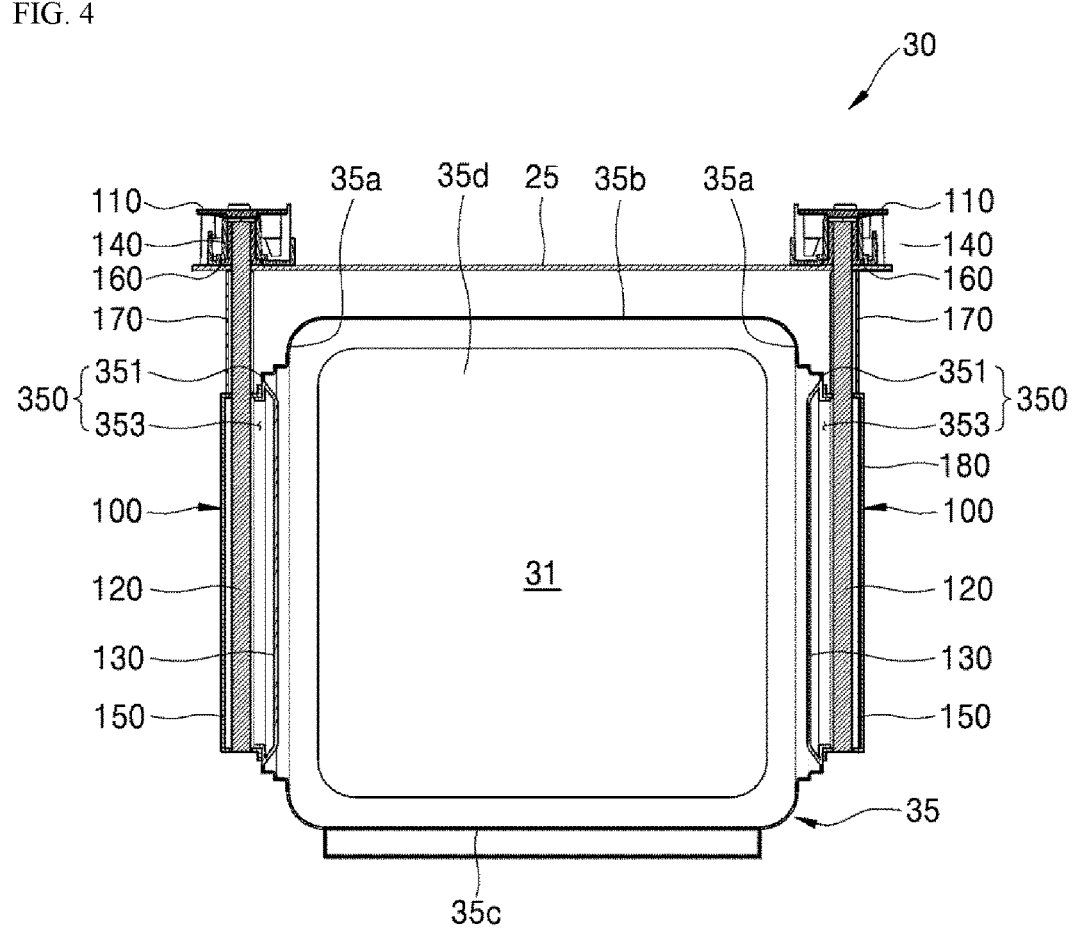
FIG. 4 is a cross-sectional view taken along line IV-IV shown in FIG. 3.

FIG. 3 is a view showing some components separated from the cooking appliance according to an embodiment. FIG. 4 is a cross-sectional view taken along line IV-IV shown in FIG. 3.

Referring to FIGS. 2 through 4, the cooking chamber 31 may be formed in the space surrounded by a cavity 35 forming an inner shape of the oven 30. For example, the cavity 35 is illustrated as being formed in a hexahedron shape including both side walls 35a, a top face 35b, a bottom face 35c, and a back face 35d. The front of the cavity 35 may be open so that the cooking chamber 31 therein may open toward the front. The door 32 may be installed at the open front of the cavity 35, so that the cooking chamber 31 may be opened or closed.

A plate 25 may be provided above the cavity 35 such that it is spaced apart from the cavity 35 by a predetermined distance. According to one embodiment, the plate 25 may act as a base plate that forms a bottom face of the cooktop 20. According to one embodiment, the cooktop 20 may be provided above the cavity 35 in the oven 30. The cooktop case 23 may be provided between the oven 30 and the top plate 21 and may have a box shape with an open top and may form a predetermined internal space under the top plate 21.

The top plate 21 may be installed at the open top of the cooktop case 23 to enclose the internal space of the cooktop case 23. One or more cooktop heaters 22 may be installed in the internal space of the cooktop case 23. A bottom face of the cooktop 20 having the internal space formed therein may be formed with the plate 25.

A light installation area 350 may be formed in the cavity 35. The light installation area 350 may be a groove formed in the cavity 35 where a lighting device 100 may be installed. According to one embodiment, the light installation area 350 may be provided on each of the side walls 35a of the cavity 35.

According to one embodiment, the upper heater 36 may be installed on the upper face 35b of the cavity 35, and the lower heater 37 may be installed on the lower face 35c of the cavity 35. The convection fan 38 may be installed on the back face 35d of the cavity 35. It may be difficult to find a location where the lighting device 100, which may be vulnerable to heat, may be installed due to locations of the heaters and the convection fan. Therefore, the light installation area 350 may be provided on each of the side walls 35a of the cavity 35.

The light installation area 350 may include a mounting face 351 and a through hole 353. The mounting face 351 may refer to a face of the cavity 35 where the lighting device 100 is installed and may occupy a part or portion of the side wall 35a of the cavity 35. The through hole 353 may penetrate the side wall 35a of the cavity 35 and the mounting face 351 to form a path that connects the inside and outside of the cavity 35.

The light installation area 350, including the mounting face 351 and the through hole 353, may be provided at a location that allows the lighting device 100 to provide effective illumination. In one embodiment, the light installation area 350 may be provided near a center of each of the side walls 35a of the cavity 35.

The light installation area 350 may include a side surface of the cavity 35 in which the through hole 353 is formed, that is, a part or portion of the side wall 35a. The inner side surface of the light installation area 350 may be provided closer to the outside than an inner side surface of the side wall 35a of the cavity 35 and forms a recessed surface.

Specifically, the inner side surface of the side wall 35a of the cavity 35 may form a plane, and the inner side surface of the mounting face 351 of the light installation area 350 may also form a plane in parallel with the inner side surface of the side wall 35a of the cavity 35, such that the inner side surface of the mounting face 351 forms a recessed surface in a lateral direction with respect to the inner side surface of the side wall 35a. The inner side surface of the light installation area 350 may have a recessed groove shape formed toward the inner side surface of the side wall 35a of the cavity 35 in the lateral direction.

Figure 5:
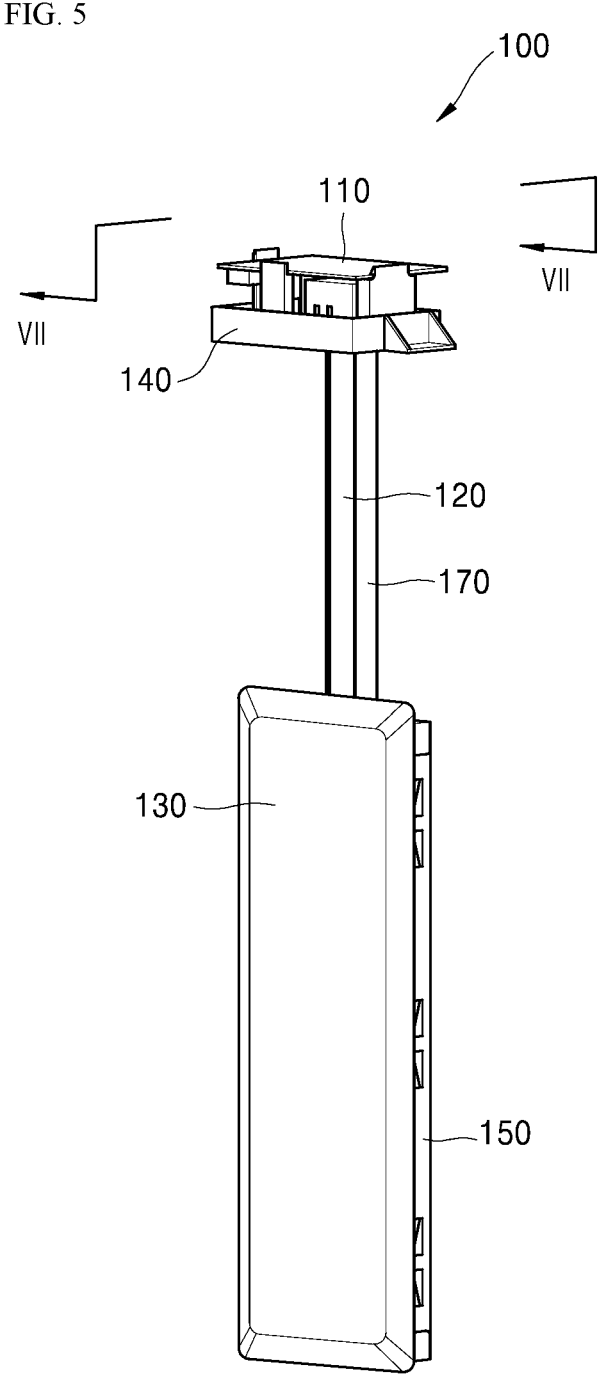
FIG. 5 is a perspective view of the lighting device shown in FIG. 3.
Figure 6:
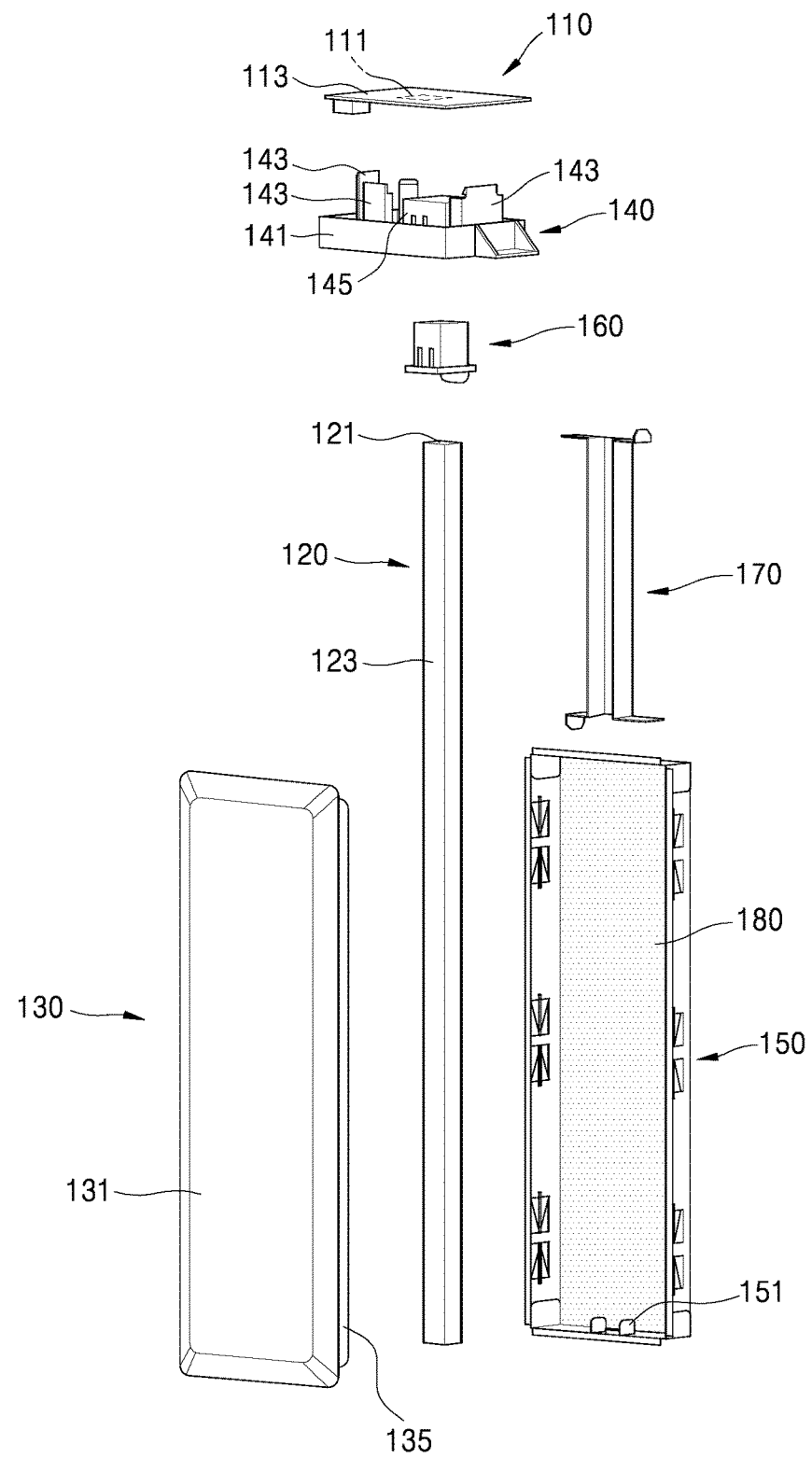
FIG. 6 is an exploded perspective view of the lighting device shown in FIG. 5.

FIG. 5 is a perspective view of the lighting device shown in FIG. 3. FIG. 6 is an exploded perspective view of the lighting device shown in FIG. 5.

Referring to FIGS. 4 to 6, the lighting device 100 may include a light source 110, a light tube 120, a transmissive cover 130, and a supporter 140. The light source 110 provides illuminating light. According to one embodiment, the light source 110 may include a light emitter 111 that emits light and a substrate 113 on which the source is mounted. The light emitter 111 may be a light-emitting diode (LED), for example.

That is, the light source 110 may be implemented as substrate 113, such as a printed circuit board (PCB), for example, on which at least one light emitter or LED 111 is mounted. The LED 111 may be mounted on a lower surface of the substrate 113, for example, which faces the light tube 120.

A variety of elements, other than LEDs, that emit light may be employed as the light emitter 111 of the light source 110 according to an embodiment. The number of light emitters 111 may be determined based on a desired intensity and area of illumination to be obtained by the lighting device 100.

The light tube 120 may be installed outside the cavity 35 and may be connected to the light source 110. The light tube 120 may be disposed outside the cavity 35 such that at least a part or portion of the light tube 120 may be exposed to the inside of the cavity 35 via the through hole 353 formed in the light installation area 350.

According to one embodiment, the light tube 120 may be a rectangular rod-shaped light guide tube having a length extending in a vertical direction. The light tube 120 may be made of a material capable of transmitting light and may have a length extending from a position adjacent to an LED 111 to a position where the through hole 353 is formed. In the light tube 120, a top surface facing the LED 111 may serve as a light incidence surface 121, and a side surface facing the through hole 353 may serve as a light exit surface 123. The light tube 120 may receive the light emitted from the above LED 111 via the light incidence surface 121, and may allow the light received via the light incidence surface 121 to diffuse in the area where the through hole 353 is formed.

The transmissive cover 130 may be installed in the cavity 35. More specifically, the transmissive cover 130 may be installed in the light installation area 350 so as to cover the through hole 353. The transmissive cover 130 may allow the light diffused in the light tube 120 to be transmitted toward the cooking chamber 31 in the cavity 35. The transmissive cover 130 may cover the through hole 353 in order to prevent the heat inside the cooking chamber 31 from leaking out of the cavity 35 via the through hole 353, and may allow the light diffused outside the cavity 35 via the through hole 353 to be transmitted toward the cooking chamber 31.

The transmissive cover 130 may be provided on an inner side surface of the side wall 35a of the cavity 35. More specifically, the transmissive cover 130 may be provided on the inner side surface of the mounting face 351 of the light installation area 350, and may be made, for example, of a material having high heat resistance and capable of withstanding a high temperature environment in the cooking chamber 31.

A diffusion pattern may be formed on a back face 133 of the transmissive cover 130 that is opposed to a light exit surface 131 of the transmissive cover 130. The diffusion pattern may be printed on the back face 133 or may be formed by a roughening treatment on a surface of the back face 133.

The supporter 140 may support the light source 110 such that the light source 110 is spaced apart from the cavity 35 and is installed outside the cavity 35. More specifically, the supporter 140 may be installed on the plate 25 on top of the cavity 35. The supporter 140 may be made of a material having a low thermal conductivity such as plastic, for example, in order to prevent the heat of the cavity 35 from being transferred to the light source 110. The supporter 140 may include a coupling part or portion 141, a supporting part or portion 143, and a fixing part or portion 145.

The coupling portion 141 may fix the supporter 140 to the outside of the cavity 35. The coupling portion 141 may have a size and shape conforming to a size and shape of the substrate 113 and may have a sufficient thickness necessary to stably couple with the plate 25. The supporting portion 143 may be provided on the coupling portion 141 and may support the light source 110 by extending upward from the coupling portion 141 in the vertical direction. The fixing portion 145 may be coupled with the light tube 120. The fixing portion 145 may fix the light tube 120 such that the light incidence surface 121 of the light tube 120 faces an LED 111, and may include a supporting boss 145a and a fitting hole 145b.

The supporting boss 145a may be provided on the supporting portion 143 at an approximate center in a front-rearward direction and the lateral direction, and may form a support wall extending upward from the coupling portion 141. The fitting hole 145b may be formed by penetrating through the supporting boss 145a in the vertical direction. The fitting hole 145b formed in the supporting boss 145a may be positioned within the path of the light emitted by the LED 111.

The light tube 120 may be inserted into the supporting boss 145a through the fitting hole 145b. The light tube 120 inserted into the supporting boss 145a may be fixed to the supporter 140 so as to face the LED 111. The coupling portion 141 may be coupled with the plate 25 with a predetermined spacing such that the supporter 140 may be fixed outside the cavity 35. A bottom face and a periphery of the substrate 113 may be supported by the supporting portion 143, so that the light source 110 may be fixed to the supporter 140 while being spaced apart from the cavity 35. In addition, an upper portion of the light tube 120 may be inserted into the supporting boss 145a via the fitting hole 145b, such that the light incidence surface 121 of the light tube 120 faces the LED 111.

Figure 7:
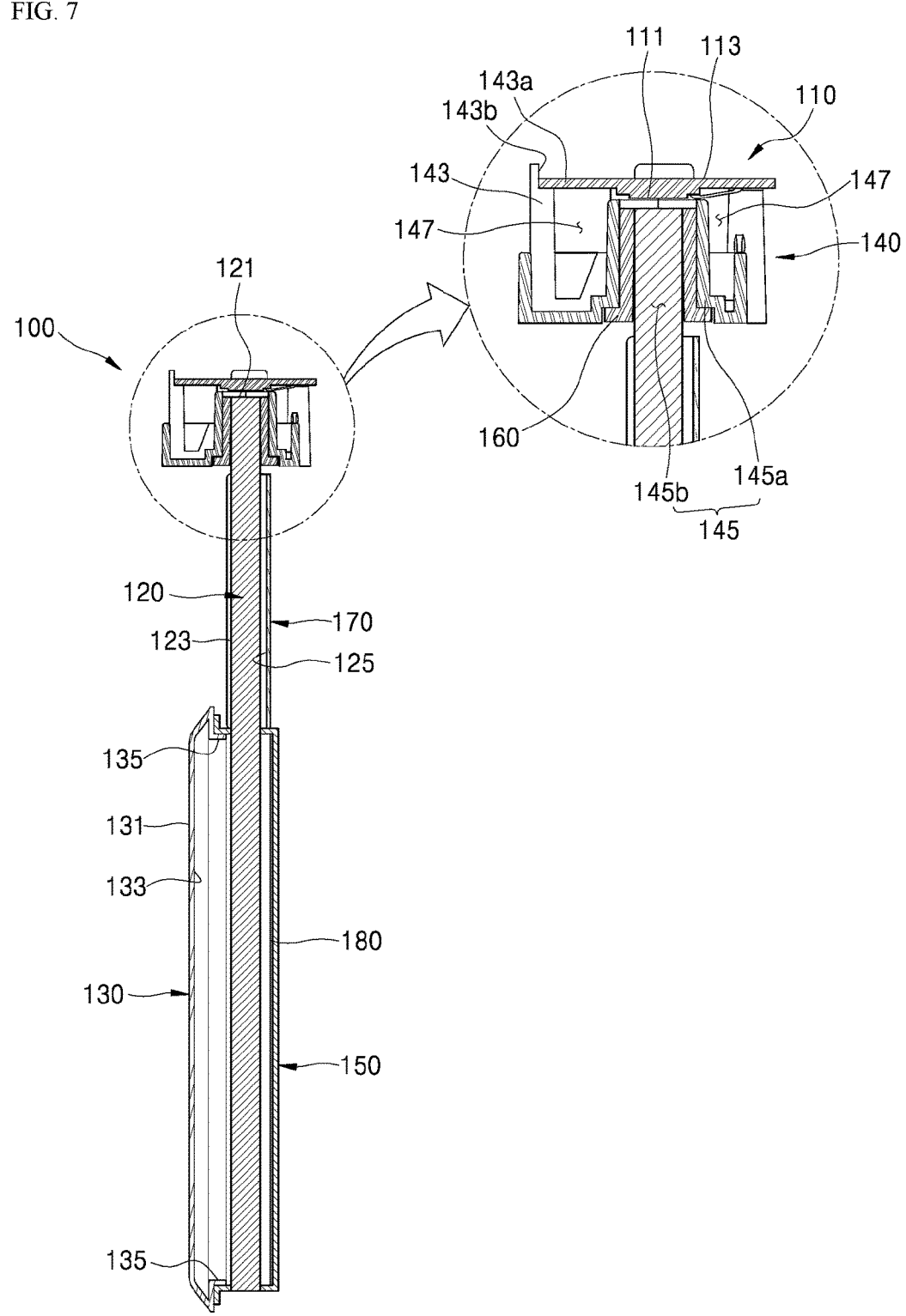
FIG. 7 is a cross-sectional view taken along line VII-VII of FIG. 4.
Figure 8:
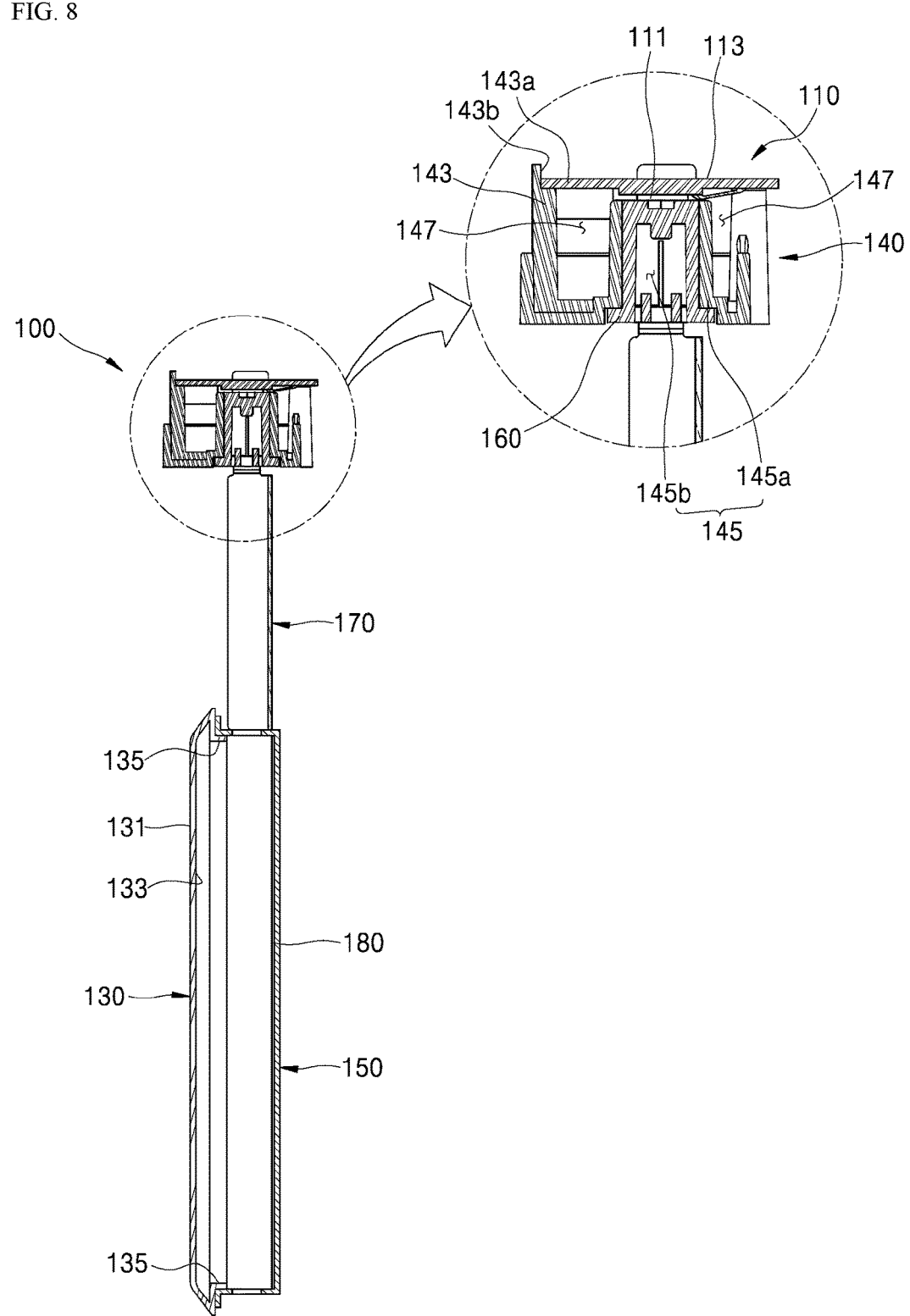
FIG. 8 is a cross-sectional view of the lighting device shown in FIG. 7 from which a light tube has been removed.
Figure 9:
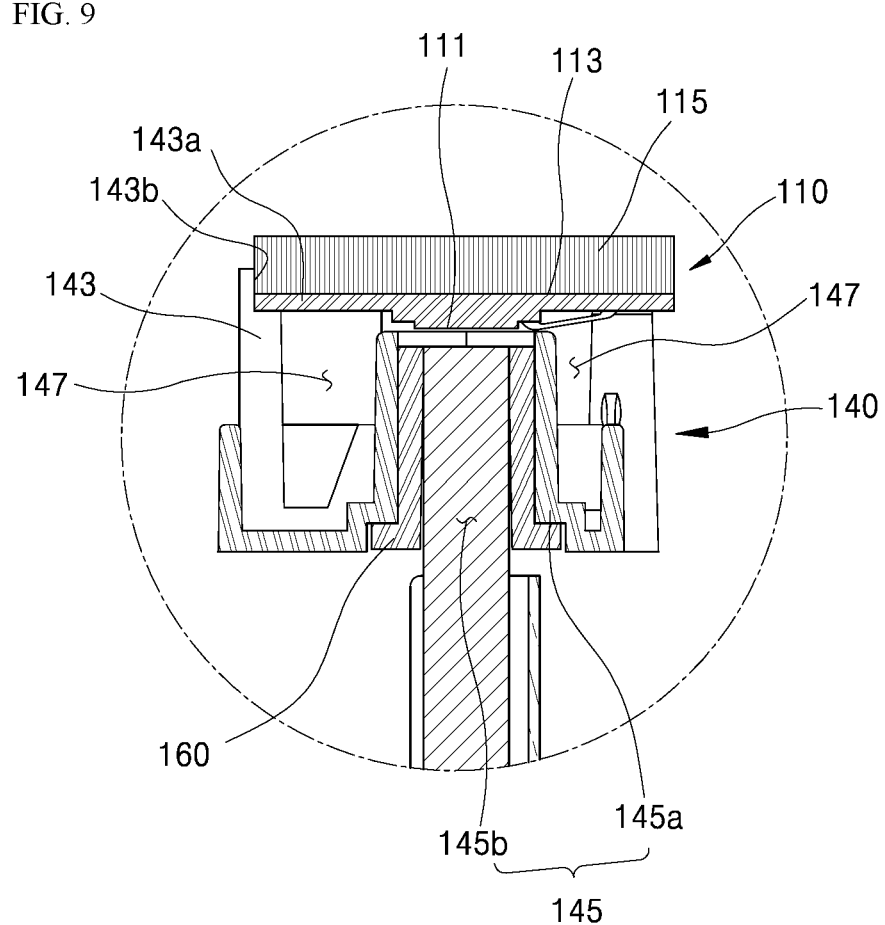
FIG. 9 is a cross-sectional view of another example of the lighting device shown in FIG. 7.

FIG. 7 is a cross-sectional view taken along line VII-VII of FIG. 4. FIG. 8 is a cross-sectional view of the light device shown in FIG. 7 from which a light tube has been removed. FIG. 9 is a cross-sectional view of an example of the lighting device shown in FIG. 7.

Referring to FIGS. 4 to 8, the supporter 140 may include a plurality of supporting portions 143. The plurality of supporting portions 143 may be provided at positions on a periphery of the substrate 113, respectively, and may be spaced apart from one another along a direction in which the periphery of the substrate 113 extends. A seating surface 143a may be formed at a top of each of the supporting portions 143, and a bottom face of the substrate 113 may be seated on the seating surfaces 143a, so that the light source 110 is supported by the supporting portions 143. The light source 110 may be fixed on the supporter 140 such that the substrate 113 is supported by the supporting portions 143 and the LED 111 mounted on the bottom face of the substrate 113 may be surrounded by the supporting portions 143.

A supporting protrusion 143b may protrude upward on a side end of the seating surface 143a. A movement of the substrate 113 seated on the seating surface 143a in the lateral direction may be restricted by the supporting protrusion 143b. The light source 110 and the substrate 113 installed on the supporting portions 143 may therefore be stably supported.

In addition, the supporter 140 may include a through passage 147. The through passage 147 may form a passage which laterally passes through the supporting portions 143 between the coupling portion 141 and the substrate 113. According to an embodiment, the through passage 147 may be a space formed between the supporting portions 143 provided on the coupling portions 141, as the supporting portions 143 may be spaced apart from one another in the lateral direction.

The through passage 147 may form a passage above the supporter 140 via which air may flow from the outside to the inside of the supporter 140. A cooling structure may be provided on the supporter 140 such that the LED 111 and the substrate 113 may be cooled by the outside air passing through the inside of the supporter 140 via the through passage 147.

According to one embodiment, the light source 110 installed as described above may not be directly installed on the top surface of the cavity 35 but may be formed on the plate 25 provided above the cavity 35 with a spacing such that the light source 110 is spaced apart from the cavity 35. In addition, the light source 110 may not be directly installed on the plate 25 but may be supported by the supporter 140 installed on the upper surface of the plate 25, such that the light source 110 is spaced apart from the plate 25 by a predetermined distance.

That is, the light source 110 may be spaced apart from the cavity 35 by a predetermined distance in the vertical direction and may also be spaced apart from the plate 25 by a predetermined distance in the vertical direction. The light source 110 may be less affected by the heat transferred from the cavity 35 at a high temperature.

In addition, according to one embodiment, the plate 25 may protrude laterally from the side wall 35*a* of the cavity 35 in which the through hole 353 is formed. The supporter 140 and the light source 110 may be provided on a portion of the plate 25 that protrudes from the side wall 35*a* of the cavity 35 in the lateral direction, such that they are installed on an outer side of the cavity 35 in the lateral direction.

The light source 110 may be provided at a position spaced apart from the cavity 35 in the vertical direction and also in the lateral direction, and thus, the light source 110 may be less affected by the heat transferred from the cavity 35 at a high temperature.

According to one embodiment, the plate 25 on which the supporter 140 and the light source 110 are installed may act as a base plate that forms a bottom face of the cooktop 20. The cooktop heaters 22 and electrical components that drive the cooktop heaters 22 may be installed in an internal space of the cooktop 20 having the plate 25 act as the bottom face, along with a cooling unit that cools the cooktop heaters 22 down by introducing external air into the cooktop 20.

The cooling unit may be provided in the internal space of the cooktop case 23 to blow cool air and may include a cooling fan that suctions the outside air flowing through a duct connected to the outside of the cooktop 20 to discharge the air toward the internal space of the cooktop 20.

According to one embodiment, as the light source 110 may be provided on the upper surface of the plate 25 forming a bottom face of the cooktop 20 and may be positioned in the internal space of the cooktop 20, the light source 110, as well as electrical components, may be cooled down by the cooling unit installed in the cooktop 20. In particular, as the cool air transferred to the light source 110 by the cooling unit may pass through the through passage 147 formed in the supporter 140, the cooling effect may be further increased.

In summary, the light source 110 according to one embodiment may be installed at a position spaced away from the cavity 35 in the vertical direction and in the lateral direction, so that it is less likely to be affected by the heat transferred from the cavity 35 at a high temperature. The light source 110 may be cooled down by external air passing through the supporter 140 via the through passage 147 provided in the supporter 140 and may be cooled down by a cooling unit installed in the internal space of the cooktop 20. It is therefore possible to protect the light emitter or LED 111 from overheating, thereby preventing deterioration of performance and shortening of the service life of the LED 111.

The light source 110 may further include, for example, a heat sink 115 as shown in FIG. 9. The heat sink 115 may be provided on the upper surface of the substrate 113. A plurality of radiation fins may be installed on the upper surface of the substrate 113 and may be exposed above the supporter 140 and the light source 110. The heat sink 115 may dissipate the heat from the light emitter or LED 111 and the substrate 113, further improving heat dissipation from the light source 110.

Referring to FIGS. 4 to 8, the inner side surface of the side wall 35*a* of the cavity 35 facing the cooking chamber 31 may be planar. In addition, the inner side surface of the mounting wall 351 of the light installation area 350 facing the cooking chamber 31 may also form a plane in parallel with the inner side surface of the side wall 35*a* of the cavity 35, and the inner side surface of the mounting surface 351 of the light installation area 350 may be formed more to the outside than the plane of the inner side surface of the side wall 35*a* in the lateral direction. The the light installation area 350 may have a recessed groove shape from the inner side surface of the cavity 35 in the lateral direction.

The transmissive cover 130 coupled to the inner side surface of the mounting surface 351 and the through hole 353 of the light installation area 350 formed in the recessed groove may not protrude toward the inside of the cooking chamber 31 from the inner side surface of the side wall 35*a* of the cavity 35 near the light installation area 350. That is, a length of a portion of the transmissive cover 130 exposed into the cooking chamber 31 in the lateral direction from the inner side surface of the mounting surface 351 is not longer than a depth of the recessed groove formed from the inner side surface of the side wall 35*a*, such that the transmission cover 130 coupled to the light installation area 350 is positioned in the recessed groove formed by the light installation area 350.

Even if a structure such as the transmissive cover 130 is installed on the inner side surface of the light installation area 350 to cover the through hole 353 penetrating the cavity 35, there is no part or component protruding toward the inside of the cooking chamber 31 from the inner side surface of the side wall 35*a*. Therefore, the structure installed in the cooking chamber 31 that illuminates the inside of the cooking chamber 31 does not reduce a volume of the cooking chamber 31. In addition, it is possible to prevent the cooking chamber 31 from being contaminated because there may be no protruding structure into the cooking chamber 31 from the side wall 35*a* that may contact food when it is placed in or taken out of the cooking chamber 31.

In addition, the lighting device 100 according to one embodiment may further include a rear cover 150. The rear cover 150 may be installed in the cavity 35 to cover the through hole 353 and may be formed on the outer side surface of the cavity 35, unlike the transmissive cover 130 installed on the inner side surface 39*b* of the cavity 35. The rear cover 150 may be coupled with the transmissive cover 130 via the light tube 120 provided outside the cavity 35 therebetween.

According to one embodiment, the transmissive cover 130 may be formed in a box-like shape with an open face toward the outside of the side wall 35*a*. The rear cover 150 may be formed in a box-like shape with an open face toward the inside of the side wall 35*a*.

A coupling protrusion 135 may be formed on one side of the transmissive cover 130 facing the rear cover 150 such that the coupling protrusion protrudes toward the outside of the side wall 35a. The coupling protrusion 135 may pass through the through hole 353 and may be coupled to the rear cover 150 at the outside of the cavity 35. The transmissive cover 130 may be coupled with the rear cover 150 via the coupling protrusion 135. A closed space may be formed by the transmissive cover 130 and the rear cover 150 therebetween.

According to one embodiment, the coupling protrusion 135 may be coupled with the rear cover 150 by inserting the former into the latter, for example. The coupling protrusion 135 may engage with an inner peripheral surface of the cavity 35 in which the through hole 353 is formed. By coupling the coupling protrusion 135 with the rear cover 150, the transmissive cover 130 may be coupled with the rear cover 150, and the transmissive cover 130 and the rear cover 150 may also be fixed to the cavity 35. As a result, the transmissive cover 130 and the rear cover 150 may be installed more easily and quickly.

The light tube 120 may be inserted into the supporting boss 145a via the fitting hole 145b. The light tube 120 inserted into the supporting boss 145a may be fixed to the supporter 140 such that the light incidence surface 121 may face the light emitter or LED 111. An upper side of the light tube 120 may thus be fixed. The light source 110 may be fixed to the supporter 140 that fixes the light tube 120. That is, the light source 110 and the light tube 120 may be assembled together using the single supporter 140.

The lighting device 100 according to one embodiment may further include a packing part or portion 160. The packing portion 160 may be fitted on an outer side of the light tube 120 and may be inserted into the supporting boss 145a via the fitting hole 145b to fix the light tube 120 to the supporter 140. The packing portion 160 may be made using elastic material having a high friction coefficient, such as silicone rubber, for example. The packing portion 160 may be interposed between the light tube 120 and the supporting boss 145a so as to maintain the coupling between the light tube 120 and the supporting boss 145a and prevent the tube 120 from being in contact with the supporter 140. The packing portion 160 may also absorb impact delivered via the supporter 140, protecting the light tube 120 from damage due to scratching or impact caused by contact.

The upper side of the light tube 120 fixed to the supporter 140 may penetrate the plate 25 in the vertical direction on the outer side of the cavity 35 in the lateral direction, such that the lower side of the light tube 120 may be inserted into the space between the transmissive cover 130 and the rear cover 150. The lower side of the light tube 120 inserted into the space between the transmissive cover 130 and the rear cover 150 may be fixed by the rear cover 150. For example, a structure that fixes the lower side of the light tube 120 may be provided on the bottom face of the rear cover 150 facing the lower side of the light tube 120, and the lower side of the light tube 120 may be fixed to such a structure.

For example, a pair of fitting ribs 151 may be provided on a bottom face of the rear cover 150 facing the lower side of the light tube 120 such that they are spaced apart from each other by a distance equal to a width of the light tube 120. The lower side of the light tube 120 may be fitted between the pair of fitting ribs 151, thereby fixing the lower side of the light tube 120.

By simply fitting the lower side of the light tube 120 between the pair of fitting ribs 151, the lower side of the light tube 120 may be fixed stably, easily, and quickly. As the supporter 140 is coupled with the rear cover 150, the supporter 140 and the rear cover 150 may also be coupled with each other via the light tube 120, and the fixing structure of the rear cover 150 provided on the cavity 35 may also become more stable.

The upper side of the light tube 120 may be fixed by fitting between the rest of the light tube 120 and the supporting boss 145a via the packing portion 160. The side of the light tube 120 passing through the plate 25 may be supported by the plate 25. In addition, the lower side of the light tube 120 may be fixed by fitting between the light tube 120 and the fitting ribs 151 formed on the bottom face of the rear cover 150.

As a result, the coupling between the light tube 120 and the supporting boss 145a may be maintained. In addition, the light tube 120 may be protected from damage due to scratching or impact caused by contact.

The upper and lower sides of the light tube 120 may be fixed by the coupling between the supporter 140 and the light tube 120 and between the supporter 140 and the rear cover 150 via the supporter 140, so that the light tube 120 may be maintained stable. The fixing structure of the rear cover 150 installed on the cavity 35 may also be made more stable.

Figure 10:
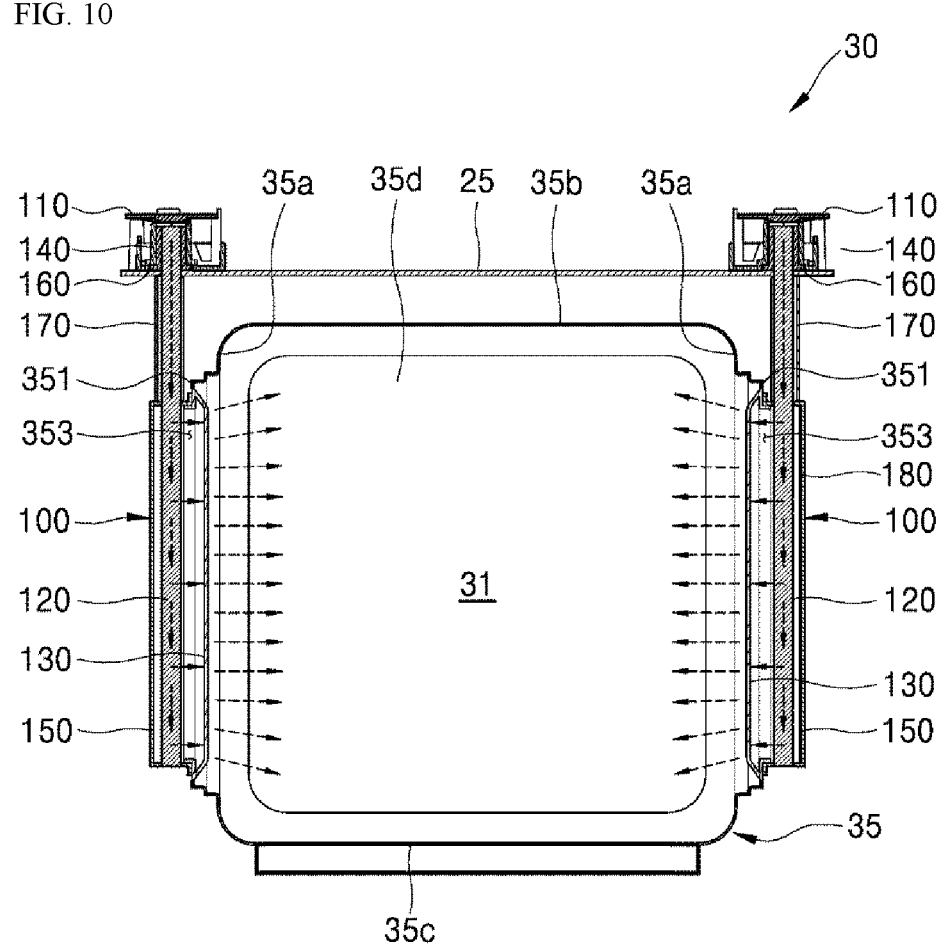
FIG. 10 is a view showing illumination provided by the lighting device shown in FIG. 4.

FIG. 10 is a view showing illumination provided by the lighting device shown in FIG. 4. Referring to FIGS. 6, 7 and 10, the light source 110 may be installed on the plate 25 spaced apart from the cavity 35 by a predetermined distance in the vertical direction, and may also be spaced apart from the plate 25 by a predetermined distance in the vertical direction. The light source 110 may be installed at a distance away from the cavity 35, and thus, may be less affected by the heat transferred from the cavity 35 at a high temperature.

The light emitted by the LED 111 of the light source 110 installed may thus be incident on the light incidence surface 121 of the light tube 120 fixed under the light source 110 by the supporter 140, and then diffused into the light tube 120. The light propagating into the light tube 120 may be transmitted to the through hole 353 via the light tube 120 and may be illuminated toward the transmissive cover 130 via the side surface of the light tube 120 facing the through hole 353, that is, the light exit surface 123.

In some area of the light tube 120, a reflective surface 125 that reflects light propagating into the light tube 120 may be provided. According to one embodiment, the reflective surface 125 may be formed on a surface opposite to the light exit surface 123. The reflective surface 125 may be formed by applying or printing a material or a pattern that reflects light on the side surface of the light tube 120. By adjusting a formation position of the reflective surface 125, it is possible to adjust a direction and the area in which the light is illuminated by the light tube 120.

The lighting device 100 according to one embodiment may further include a shielding cover 170. The shielding cover 170 may be installed such that it surrounds the light tube 120 in a region between the supporter 140 and the transmissive cover 130. An inner surface of the shielding cover 170 may be subjected to reflective surface treatment. The shielding cover 170 may block the light from leaking out of the light tube 120 between the supporter 140 and the transmissive cover 130, such that the light may be more effectively transmitted from the light incidence surface 121 to the light exit surface 123.

The light exit surface 123 of the light tube 120 may be located in a closed space formed between the transmissive cover 130 and the rear cover 150. In this closed space, light may be illuminated toward the transmissive cover 130. As the light diffuses via the light tube 120 in the closed space between the transmissive cover 130 and the rear cover 150, light may travel only in a direction in which it passes through the transmissive cover 130. The light passing through the transmissive cover 130 may illuminate the cooking chamber 31.

In addition, a reflecting part or portion 180 may be further provided in the closed space formed between the transmissive cover 130 and the rear cover 150. The reflecting portion 180 may be provided on a surface of the rear cover 150 facing the transmissive cover 130, that is, on the inner surface of the rear cover 150. The reflecting portion 180 may reflect the light propagating from the light tube 120 to the rear cover 150 toward the transmissive cover 130, thereby improving the illumination inside the cooking chamber 31.

The reflecting portion 180 may be made of a material having a high reflectance of light, such as aluminum or stainless steel, for example. The reflecting portion 180 may be formed on the inner surface of the rear cover 150. The rear cover 150 may be made of aluminum or stainless steel, or example, or may be coated with aluminum, for example, on the inner surface. In addition, other different materials having high light reflectance may be used as the material of the rear cover 150 or the coating material.

The LED 111, which is a light source that emits light for illumination, may be installed outside the cavity 35 and in turn outside the cooking chamber 31. The light emitted from the LED 111 may be efficiently transmitted toward the inside of the cooking chamber 31, even in a high-temperature environment inside the cooking chamber 31.

The light source 110 may be installed at a position spaced away from the cavity 35 in the vertical direction and in the lateral direction, so that it is less likely to be affected by the heat transferred from the cavity 35 at a high temperature. The light source 110 may also be cooled down by external air passing through the supporter 140 via the through passage 147 provided in the supporter 140, and may be cooled down by cool air transferred by a cooling unit installed in the internal space of the cooktop 20. It is therefore possible to protect the LED 111 from overheating, enhancing long-term performance and the service life of the LED 111.

A lighting device capable of providing illumination using an LED even in a hot cooking chamber and a cooking appliance including a lighting device are disclosed herein. The lighting device according to embodiments disclosed herein may include a light source installed outside a cavity where a through hole connecting an inside and outside of the cavity may be formed and including an LED; a light tube installed outside the cavity to be connected to the light source, wherein at least a part or portion thereof may be provided outside the cavity such that it is exposed to the inside of the cavity via the through hole, and wherein the light emitted from the LED may be received via a light incidence surface facing the LED and diffuses in an area where the through hole is formed; a transmissive cover installed on the cavity to cover the through hole and transmit the light diffused from the light tube into the cavity; and a supporter installed outside the cavity to support the light source such that it is spaced apart from the cavity.

The supporter may include a coupling part or portion that fixes the supporter so that it is fixed outside the cavity, and a supporting part or support extended in a vertical direction from the coupling part and supporting the light source such that it is spaced apart from the coupling part in the vertical direction.

The light source may further include a substrate on which the LED is mounted to face the light tube. The supporter may further include a through passage and may form a passage that penetrates the supporter in a lateral direction between the coupling part and the substrate.

The through hole may be formed such that it is located on a side of the cavity. A plate may be provided above the cavity with a predetermined spacing, and wherein the supporter may be installed on the plate.

The plate may protrude in a lateral direction from a side of the cavity where the through hole is formed. The supporter and the light source may be installed on the plate such that they are located on a portion of the plate that protrudes from the side wall of the cavity in the lateral direction. The light tube may penetrate the plate in the vertical direction on an outer side of the cavity in the lateral direction and be coupled with the supporter on the plate.

The supporter may further include a fixing part or portion which may be coupled with the light tube to fix the light tube such that the light incidence surface faces the LED. The fixing part may include a supporting boss extended in a vertical direction from the coupling part, and a fitting hole formed by penetrating the coupling part and the supporting boss in the vertical direction. The light tube may be inserted into the supporting boss via the fitting hole such that it is fixed to the supporter at a position where the light incidence surface faces the LED.

The lighting device may further include a packing part or portion made of an elastic material and fitted outside the light tube. The packing part may be inserted into the supporting boss via the fitting hole to fix the light tube to the supporter. The packing part may be made of a silicone rubber material, for example.

The light tube may be formed in a rod shape having a length extending in the vertical direction, for example. The lighting device may further include a shielding cover installed between the supporter and the transmissive cover such that it covers the light tube to block the light from diffusing out of the light tube between the supporter and the transmissive cover.

The light source may include a substrate having the LED mounted on its bottom face facing the light tube; and a heat sink provided on a top face of the substrate to dissipate heat from the LED and the substrate. The lighting device may further include a rear cover installed on the cavity to cover the through hole and coupled with the transmissive cover with the light tube therebetween. A reflecting part or portion may be provided on a face of the rear cover facing the transmissive cover to reflect the light diffused from the light tube toward the transmissive cover.

A cooking appliance according to embodiments disclosed herein may include a cavity in which a cooking chamber may be formed; a heater that generates heat to heat the cooking chamber; a light installation area including a through hole that penetrates the cavity to connect an inside and outside of the cavity; and a lighting device installed at the light installation area that illuminates the cooking chamber. The lighting device may include a light source installed outside the cavity and comprising an LED that emits light; a light tube installed outside the cavity to be connected to the light source, wherein at least a part or portion thereof is provided outside the cavity such that it is exposed to the inside of the cavity via the through hole and wherein the light emitted from the LED is received via a light incidence surface facing the LED and diffuses in an area where the through hole is formed; a transmissive cover installed at the light installation area to cover the through hole and transmitting the light diffused from the light tube into the cavity; and a supporter installed outside the cavity to support the light source unit such that it is spaced apart from the cavity.

The light installation area may include a part or portion of a side surface of the cavity in which the through hole is formed. An inner side surface of the light installation area located in the cooking chamber may be recessed in a lateral direction more than an inner side surface of the cavity located in the cooking chamber. The transmissive cover may be installed such that it does not protrude into the cooking chamber from the inner side surface of the cavity around the inner side surface of the light installation area.

A plate may be disposed above the cavity with a predetermined spacing, and the light source may be installed on the plate. The cooking appliance may further include a cooktop provided above the cavity and include a top plate and a cooktop case. The plate may form a bottom face of the cooktop.

According to embodiments, an LED, which acts as a light source that emits illuminating light, may be installed outside a cavity and in turn outside a cooking chamber. The light emitted from the LED installed outside the cavity may be be efficiently transmitted toward the inside of the cooking chamber. Therefore, it is possible to effectively provide illumination using the LED even in a high-temperature environment inside the cooking chamber.

In addition, according to embodiments, a light source may be installed at a position spaced a distance away from the cavity in the vertical direction and in the lateral direction, so that it is less likely to be affected by the heat transferred from the cavity at a high temperature. In addition, the light source may be cooled down by external air passing through a supporter via a through passage provided in the supporter and may be cooled down by cool air transferred by a cooling unit installed in the internal space of a cooktop. It is therefore possible to protect the LED from overheating, prevent a loss of long-term performance, and prevent shortening of a service life of the LED.

A lighting device according to embodiments disclosed herein may comprise a light source comprising a light emitting diode (LED) and a light tube connected to the light source, and the lighting device is configured to be installed a predetermined distance outside of a cooking chamber of a cooking appliance and wherein the lighting device illuminates the inside of the cooking chamber.

The light source may be located at a height that is higher than the height of the cooking chamber.

The light tube may include a light exit surface such that light emitted from the light exit surface illuminates the cooking chamber, and propagates in a direction that is perpendicular to the direction that light emitted from the light source propagates.

The light tube may include a light incidence surface that faces and receives light emitted from the light source, such that the light incidence surface is perpendicular to the light exit surface.

The light tube may include a reflective surface provided on a surface opposite to the light exit surface such that the reflective surface reflects light propagating into the light tube.

A cavity may be formed around the cooking chamber, and the light source is located at a position that is higher than the position of a top surface of the cavity.

A through hole may penetrate the cavity such that light transmitted from the light tube is diffused at an area where the through hole.

A transmissive cover may be installed in the cavity to cover the through hole and to transmit the light diffused from the light tube into the cavity.

A supporter may be installed outside the cavity to support the light source such that the light source is spaced apart from the cavity.

A plate may be provided above the cavity, and the supporter is installed on the plate.

A rear cover may be installed in the cavity to cover the through hole and be coupled with the transmissive cover via the light tube.

A reflecting portion may be provided on a face of the rear cover facing the transmissive cover to reflect the light diffused from the light tube toward the transmissive cover.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device comprising:
   a light source comprising a light emitting diode (LED), the light source being configured to be installed outside of a cavity adjacent a through hole that connects an inside and outside of the cavity;
   a light tube installed outside the cavity and connected to the light source, wherein a first portion of the light tube is provided outside the cavity such that the first portion of the light tube is exposed to the inside of the cavity via the through hole, and wherein the light emitted from the LED is received via a light incidence surface of the light tube facing the LED and is diffused at an area where the through hole is formed;
   a transmissive cover installed in the cavity to cover the through hole and to transmit the light diffused from the light tube into the cavity; and
   a supporter installed outside the cavity to support the light source such that the light source is spaced apart from the cavity, wherein the supporter comprises a coupling portion that fixes the supporter outside the cavity, and a supporting portion extended in a vertical direction from the coupling portion that supports the light source such that the light source is spaced apart from the coupling portion in the vertical direction, wherein the light source further comprises a substrate on which the LED is mounted to face the light tube, and wherein the supporter further comprises a through passage that forms a passage that penetrates the supporter in a lateral direction between the coupling portion and the substrate.

2. The lighting device of claim 1, wherein the through hole is located on a side of the cavity, wherein a plate is provided above the cavity with a predetermined distance therebetween, and wherein the supporter is installed on the plate.

3. The lighting device of claim 2, wherein a portion of the plate protrudes in the lateral direction from the side of the cavity where the through hole is formed, wherein the supporter and the light source are installed on the portion of the plate that protrudes from the side wall of the cavity in the lateral direction, and wherein the light tube penetrates the portion of the plate in the vertical direction at an outer side of the cavity in the lateral direction and is coupled with the supporter on the plate.

4. The lighting device of claim 2, wherein the supporter further comprises a fixing portion that fixes the light tube such that the light incidence surface faces the LED, wherein the fixing portion comprises a supporting boss extended in the vertical direction from the coupling portion and a fitting hole that penetrates the coupling portion and the supporting boss in the vertical direction, and wherein the light tube is inserted into the supporting boss via the fitting hole such that the light tube is fixed to the supporter at a position where the light incidence surface faces the LED.

5. The lighting device of claim 4, further comprising:
   a packing portion made of an elastic material provided outside the light tube, wherein the packing portion is inserted into the supporting boss via the fitting hole to fix the light tube to the supporter.

6. The lighting device of claim 5, wherein the packing portion is made of a silicone rubber material.

7. The lighting device of claim 1, wherein the light tube is formed in a rod shape having a length extending in the vertical direction, and wherein the lighting device further comprises a shielding cover installed between the supporter and the transmissive cover such that the shielding cover covers the light tube to block the light from diffusing out of the light tube between the supporter and the transmissive cover.

8. The lighting device of claim 1, wherein the light source comprises:
   a substrate on which the LED is mounted to face the light tube; and
   a heat sink provided on a top face of the substrate that dissipates heat from the LED and the substrate.

9. A lighting device comprising:
   a light source comprising a light emitting diode (LED), the light source being configured to be installed outside of a cavity adjacent a through hole that connects an inside and outside of the cavity;
   a light tube installed outside the cavity and connected to the light source, wherein a first portion of the light tube is provided outside the cavity such that the first portion of the light tube is exposed to the inside of the cavity via the through hole, and wherein the light emitted from the LED is received via a light incidence surface of the light tube facing the LED and is diffused at an area where the through hole is formed;
   a transmissive cover installed in the cavity to cover the through hole and to transmit the light diffused from the light tube into the cavity;
   a supporter installed outside the cavity to support the light source such that the light source is spaced apart from the cavity; and
   a rear cover installed on the cavity to cover the through hole and coupled with the transmissive cover via the light tube.

10. The lighting device of claim 9, wherein a reflecting portion is provided on a face of the rear cover facing the transmissive cover to reflect the light diffused from the light tube toward the transmissive cover.

11. The lighting device of claim 9, wherein a lower portion of the lighting tube is fitted between a pair of fitting ribs provided on a bottom face of the rear cover.

12. A cooking appliance, comprising:
a cavity in which a cooking chamber is formed;
a heater that generates heat that heats the cooking chamber;
a light installation area comprising a through hole that penetrates the cavity to connect an inside and outside of the cavity; and
  a lighting device installed at the light installation area that illuminates the cooking chamber, wherein the lighting device comprises:
    a light source installed outside the cavity and comprising a light emitting diode (LED) that emits light;
    a light tube installed outside the cavity that connects to the light source, wherein at least a portion of the light tube is provided at a space outside the cavity, which is exposed to the inside of the cavity via the through hole, and wherein the light emitted from the LED is received via a light incidence surface of the light tube facing the LED and is diffused in an area where the through hole is formed;
    a transmissive cover installed at the light installation area to cover the through hole, wherein the transmissive cover transmits the light diffused from the light tube into the cavity; and
    a supporter installed outside the cavity to support the light source such that the light source is spaced apart from the cavity, wherein the light installation area comprises a recessed portion of a side surface of the cavity in which the through hole is formed.

13. The cooking appliance of claim 12, wherein the transmissive cover does not protrude into the cooking chamber from an inner side surface of the cavity from an inner side surface of the light installation area.

14. A cooking appliance, comprising:
a cavity in which a cooking chamber is formed;
a heater that generates heat that heats the cooking chamber;
a light installation area comprising a through hole that penetrates the cavity to connect an inside and outside of the cavity; and
a lighting device installed at the light installation area that illuminates the cooking chamber, wherein the lighting device comprises:
  a light source installed outside the cavity and comprising a light emitting diode (LED) that emits light;
  a light tube installed outside the cavity that connects to the light source, wherein at least a portion of the light tube is provided at a space outside the cavity, which is exposed to the inside of the cavity via the through hole, and wherein the light emitted from the LED is received via a light incidence surface of the light tube facing the LED and is diffused in an area where the through hole is formed;
  a transmissive cover installed at the light installation area to cover the through hole, wherein the transmissive cover transmits the light diffused from the light tube into the cavity; and
  a supporter installed outside the cavity to support the light source such that the light source is spaced apart from the cavity, wherein a plate is provided above the cavity with a predetermined distance therebetween, and wherein the light source is installed on the plate.

15. The cooking appliance of claim 14, further comprising:
a cooktop provided above the cavity and comprising a top plate and a cooktop case, wherein the plate forms a bottom face of the cooktop.

16. The cooking appliance of claim 14, wherein a cooling unit is provided in an internal space of the cooktop case and comprises a cooling fan that suctions outside air flowing through a duct connected to the outside of the cooktop to discharge the air toward the internal space of the cooktop.

* * * * *